(12) United States Patent
Urakami

(10) Patent No.: US 6,932,182 B2
(45) Date of Patent: Aug. 23, 2005

(54) TRAVELING CAR

(76) Inventor: Fukashi Urakami, 608, Maruyoshi Bldg., 4-17-24, Konandai, Konan-ku, Yokohama-shi, Kanagawa, 234-0054 (JP)

( * ) Notice: Subject to any disclaimer, the term of this patent is extended or adjusted under 35 U.S.C. 154(b) by 0 days.

(21) Appl. No.: 10/416,625

(22) PCT Filed: Oct. 23, 2001

(86) PCT No.: PCT/JP01/09307
§ 371 (c)(1),
(2), (4) Date: May 8, 2003

(87) PCT Pub. No.: WO02/38435
PCT Pub. Date: May 16, 2002

(65) Prior Publication Data
US 2004/0026887 A1 Feb. 12, 2004

(30) Foreign Application Priority Data
Nov. 9, 2000 (JP) ........................... 2000-341444

(51) Int. Cl.$^7$ .............................................. B62D 21/00
(52) U.S. Cl. ...................... 180/311; 180/312; 280/400; 280/447
(58) Field of Search ................................ 280/304, 400, 280/441, 447, 781, 791; 180/311, 312

(56) References Cited
U.S. PATENT DOCUMENTS 2,062,282 A * 12/1936 Acton ........................... 111/20
3,882,645 A * 5/1975 Duecker ....................... 451/347
4,095,378 A   6/1978 Urakami
4,147,372 A * 4/1979 Sumpter ....................... 280/433
4,420,169 A * 12/1983 Taylor ....................... 280/446.1
4,505,631 A * 3/1985 Warner et al. ............... 414/359
5,725,231 A * 3/1998 Buie ......................... 280/455.1
5,967,609 A * 10/1999 Potter ......................... 297/325
5,987,699 A * 11/1999 Nakamura et al. ............. 15/349
6,206,393 B1 * 3/2001 Mascari et al. ............. 280/220

FOREIGN PATENT DOCUMENTS

| JP | 59-149873 | 8/1984 |
|----|-----------|--------|
| JP | 03-186468 | 8/1991 |
| JP | 04-092786 | 3/1992 |
| JP | 8-228     | 1/1996 |

* cited by examiner

Primary Examiner—Paul N. Dickson
Assistant Examiner—Toan To
(74) Attorney, Agent, or Firm—Hogan & Hartson, LLP

(57) ABSTRACT

A traveling carriage equipped with a traveling means to travel on and along a surface of an object. A frame of the traveling carriage is composed of two divided frames to the right and to the left in the forward traveling direction, one frame having an arc-shaped sliding rail which forms an arc viewed from the side. The arc-shaped sliding rail is supported by a sliding guide installed onto the other frame as to be capable of sliding along the arc-shaped sliding rail.

3 Claims, 5 Drawing Sheets

TRAVELING CAR

TECHNICAL FIELD

This invention relates to a traveling carriage traveling on the surface of a curved object, such as the interior and exterior walls of a pipe and a ship's hull, while carrying out a task, such as sand blasting, and equipped with four wheels, for example, with none of such wheels breaking away from such surface (hereinafter referred to as the "traveling surface") but all of the four wheels constantly in contact with the traveling surface, thereby enabling the apparatus to travel on and along a curved surface in a stable position, thereby gaining greater driving power.

This invention also relates to said traveling carriage equipped with two sets of caterpillars, such two sets of caterpillars supported by four belt wheels, for example, with none of such wheels breaking away from, but all of the four wheels constantly in contact with, the traveling surface, enabling the apparatus to travel on and along a curved surface in a stable position, thereby gaining greater driving power.

BACKGROUND ART

One example of traveling carriages which travel on curved surfaces, such as the interior and exterior walls of pipes and ships' hulls, while carrying out certain tasks, such as sand blasting, is disclosed in TOKUKOSHO 60-26752 (U.S. Pat. No. 4,095,378, descriptions and drawings).

The above apparatus has a decompressing housing, wheels as traveling means installed onto said decompressing housing, a suction seal connected to said decompressing housing with its free end caused to be in contact with a traveling surface, and a vacuum-generating means to discharge the fluid trapped inside a decompressed area defined by said decompressing housing, said suction seal and the traveling surface.

When said vacuum-generating means is energized, the fluid inside the decompressed area is discharged to the outside, and the fluid pressure acting upon the decompressing housing due to the pressure difference of the fluid between the inside and the outside of the decompressed area is transmitted to the traveling surface via said wheels, such fluid pressure causing the apparatus to be suction-adhered to the traveling surface.

When said wheels are driven and revolved by a driving means, such as an electric motor, during such suction-adherence state, the apparatus travels on and along the traveling surface by way of the action of the wheels.

Installed onto such apparatus is a task-performing piece of equipment, such as sand blasting equipment which jets a cleaning and polishing agent onto the traveling surface.

Such apparatus of prior art as described above has the following problems to be solved.

In the case that the traveling carriage of prior art is equipped with four wheels, one of such four wheels breaks away from a traveling surface while traveling on and along the surface of a curved object, such as the interior and exterior walls of a pipe and a ship's hull, because the apparatus does not have a frame structure whose shape changes with flexibility, resulting in a constantly unstable position, or resulting in a traveling carriage which does not have sufficient driving power due to the fact that not all the four wheels are in contact with the traveling surface.

In the case that the traveling carriage of prior art is equipped with two sets of caterpillars, one of the four belt wheels, for example, which support such two sets of caterpillars breaks away from a traveling surface, resulting in a constantly unstable position, or resulting in a traveling carriage which does not have sufficient driving power due to the fact that not all the four wheels are in contact with the traveling surface.

In order to solve such technical problems, the present invention aims to provide a traveling carriage which travels curved surfaces and is equipped with four wheels, for example, with none of such four wheels breaking away from, and all of the four wheels being in contact with, traveling surfaces, thereby enabling the apparatus to travel in a stable position or to have sufficient driving power.

The present invention also aims to provide a traveling carriage equipped with two sets of caterpillars with none of the four belt wheels which support such two sets of caterpillars breaking away from, and all of the four wheels being in contact with, traveling surfaces, thereby enabling the apparatus to travel in a stable position or to have sufficient driving power.

In order to solve the technical problems, the present invention also aims to provide a traveling carriage which suction-adheres to, and travels on and along, a traveling surface owing to the pressure of ambient fluid, such as air or water, and is capable of traveling on and along curved surfaces in a stable position or has sufficient driving power.

DISCLOSURE OF THE INVENTION

In order to solve the technical problems, the present invention aims to provide: a traveling carriage equipped with a traveling means, such as a plural number of wheels or a plural number of caterpillars, to travel on and along the surface of an object, having the characteristics that:
the frame of said traveling carriage is composed of two divided frames, one frame equipped with an arc-shaped sliding rail, said arc-shaped sliding rail so supported by a sliding guide installed onto the other frame as to be capable of sliding along an arc shape.

In the following descriptions, the frame equipped with the sliding guide and the frame equipped with the arc-shaped sliding rail, of the two divided frames, will be referred to as the main frame and as the swinging frame, respectively.

Described below as an example is the action of the traveling carriage of the present invention wherein the main frame and the swinging frame are each equipped with two wheels.

When traveling along the exterior wall of a cylindrical pipe, for example, the traveling carriage of prior art having a non-flexible frame will allow one of the four wheels to break away from its traveling surface if the central axis of the traveling direction of said traveling carriage is on the plane which obliquely crosses the central axis of said pipe. In case of the traveling carriage of the present invention, on the other hand, the entire frame changes its shape in accordance with its traveling surface by way of the swinging of the swinging frame, thereby enabling all of the four wheels to be in contact with the traveling surface. When the entire frame changes its shape, the relative positions of the main frame and the swinging frame change freely with the central axis of the swinging of the swinging frame as the central axis of rotation.

BRIEF DESCRIPTIONS OF THE DRAWINGS

BEST MODE OF THE EMBODIMENT OF THE INVENTION

One preferred embodiment example of the apparatus constructed in accordance with the present invention is explained in detail below by referring to the attached drawings.

Figure 1:
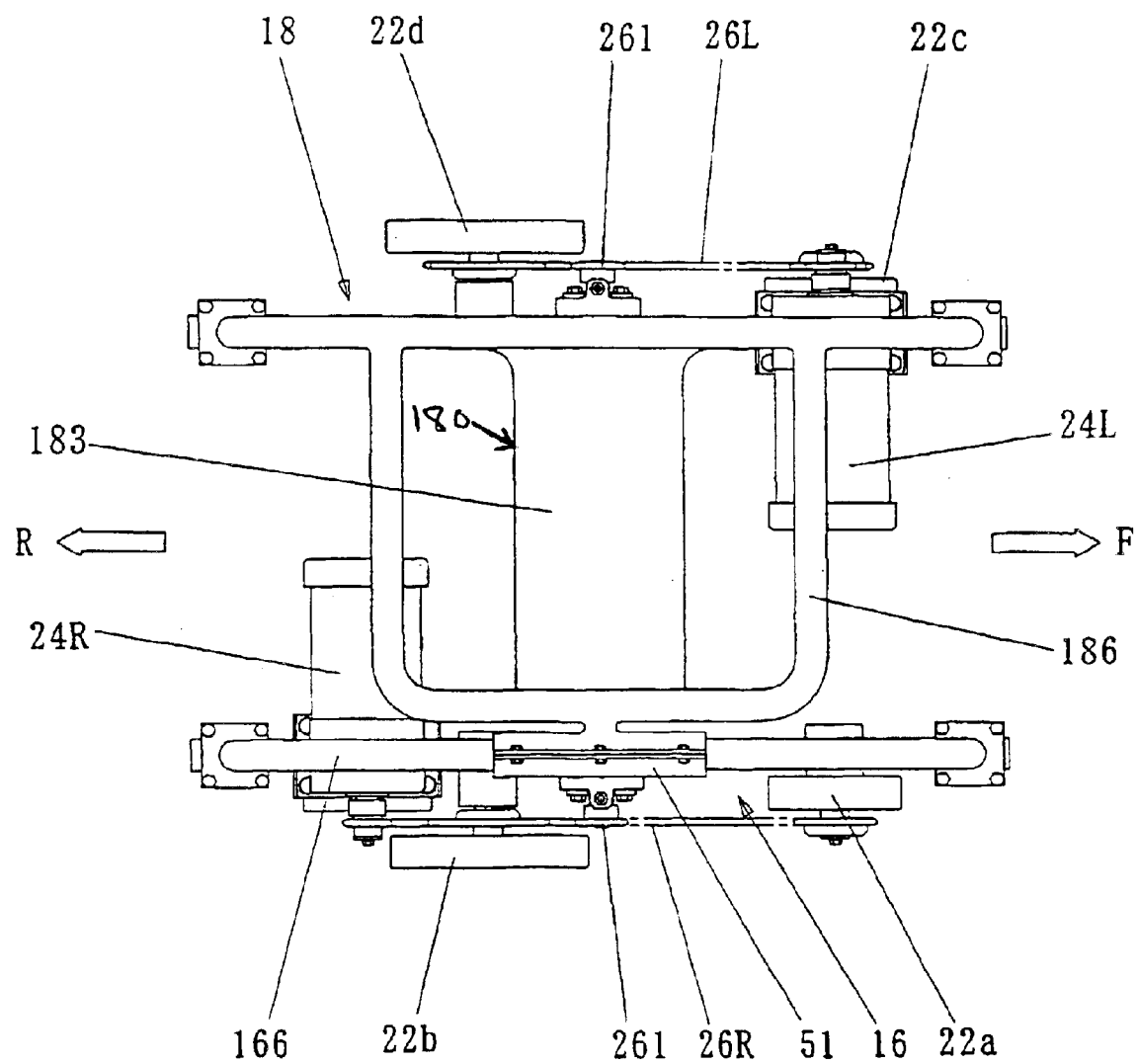
FIG. 1 is a plan of a preferred embodiment example of the apparatus constructed according to the present invention.
Figure 2:
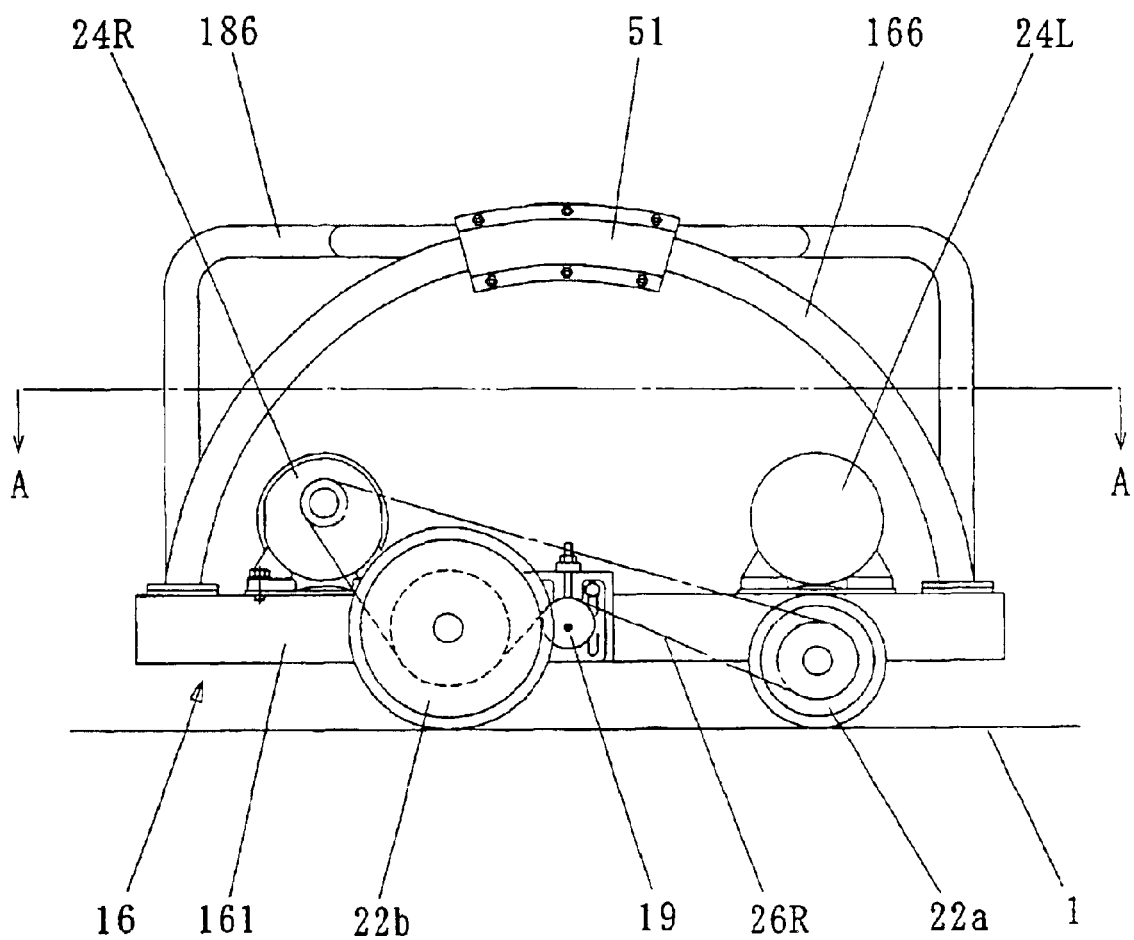
FIG. 2 shows a right side view of the apparatus shown in FIG. 1.
Figure 3:
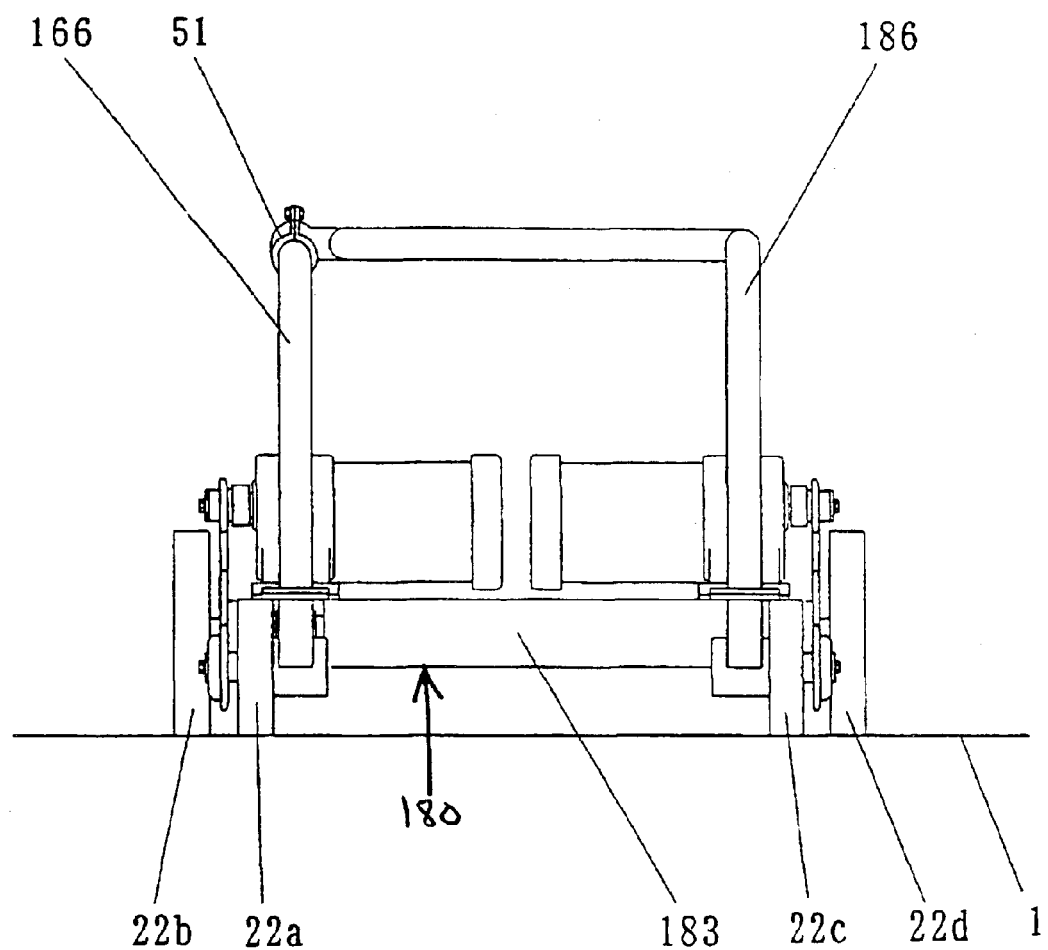
FIG. 3 shows a top view of the apparatus shown in FIG. 1.
Figure 4:
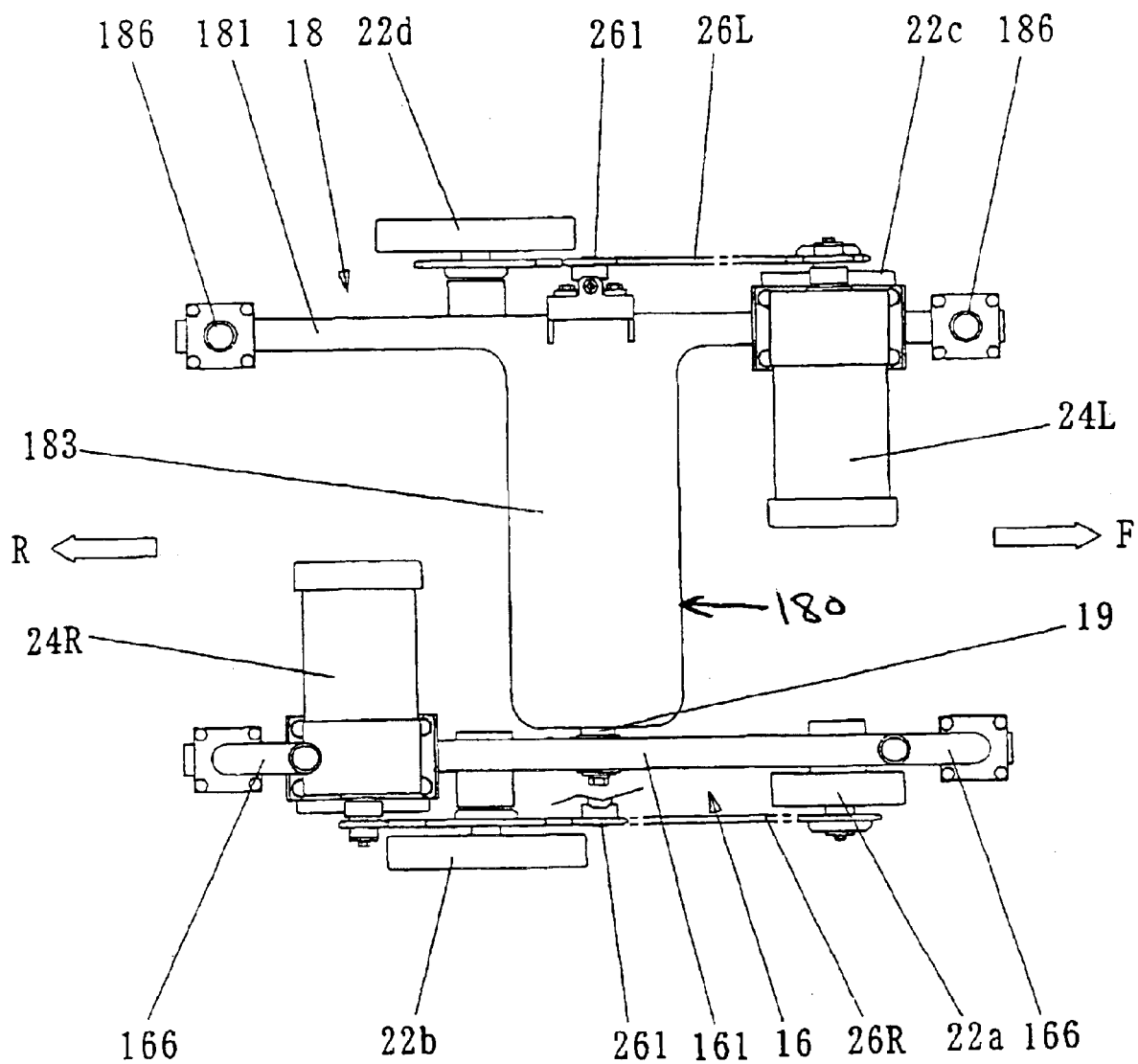
FIG. 4 is a plan showing the view of A—A of the apparatus shown in FIG. 1.

The frame of the traveling carriage shown in FIG. 1 and FIG. 4 is composed of two divided frames to the right and to the left in the forward traveling direction (shown with an arrow F): the main frame to the left 18 and the swinging frame to the right 16.

The main frame 18 is composed of the main structural member 180 and a top structural member 186. The main structural member 180 as a whole is approximately in a T shape viewed from the top, and is composed of a member 181 elongated forward and backward in the traveling direction and a member 183 extended in the direction of the swinging frame 16. Welded onto the right hand side of the member 183 is a hinge pin 19 to hinge-connect it to the swinging frame 16.

The top structural member 186 is made of a round pipe and consists of a member of a reverse U shape viewed from the side and a member of a U shape viewed from the top. Both ends of said reverse U-shaped member are fixed onto both ends of the member 181 of the main structural member 180. Fixed onto said U-shaped member in the area adjacent to the arc-shaped sliding rail 166 is a sliding guide 51.

The sliding guide 51 is composed of a housing fixed onto the top structural member 186 and an arc-shaped oil-free bush (not illustrated) installed inside said housing and made of an oil-free slidable material.

The swinging frame 16 is composed of the main structural member 161 and an arc-shaped sliding rail 166. The main structural member 161 has a shape elongated forward and backward in the traveling direction. Made in its center is a hole to install the hinge pin 19.

The arc-shaped sliding rail 166 is made of a round pipe and forms an arc with the axis of the hinge pin 19 as the center of such arc. Both ends of the arc-shaped sliding rail 166 are fixed onto both ends of the main structural member 161. The arc-shaped sliding rail 166 pierces the arc-shaped hole of the arc-shaped oil-free bush (not illustrated).

Because the main structural member 161 of the swinging frame 16 is axially supported by the hinge pin 19 and the arc-shaped sliding rail 166 is so held by the sliding guide 51 as to be capable of sliding freely, the swinging frame 16 swings with the hinge pin 19 as the pivot. In other words, the relative angle between the main frame 18 and the swinging frame 16 is freely changeable with the axis of the hinge pin 19 as the central point.

Installed onto the main structural member 180 of the main frame 18 are a driving wheel 22c, a driving wheel 22d and a geared motor 24L. Fixed onto the revolving axis of each of the driving wheels 22c and 22d and of the geared motor 24L is a sprocket, and installed around said three sprockets is a roller chain 26L. Still another sprocket 261 is for the adjustment of the tautness of the roller chain.

Installed onto the main structural member 161 of the swinging frame 16 are a driving wheel 22a, a driving wheel 22b and a geared motor 24R. Fixed onto the revolving axis of each of the driving wheels 22a and 22b and of the geared motor 24R is a sprocket, and installed around said three sprockets is a roller chain 26R. Still another sprocket 261 is for the adjustment of the tautness of the roller chain.

The driving wheels 22a, 22b, 22c and 22d are solid tires with a wear-resistant material, such as polyurethane rubber, fixed onto the external peripheries.

The action and the effects of the apparatus described above are explained below.

In FIG. 1 and FIG. 4, starting the geared motors 24L and 24R and revolving the driving wheels 22c and 22d and the driving wheels 22a and 22b in the same direction causes the traveling carriage to move straight on (forward as shown with the arrow F or backward as shown with the arrow R). Revolving the driving wheels 22c and 22d and the driving wheels 22a and 22b in the opposite direction causes the traveling carriage to gyrate (clockwise or counterclockwise) around its central axis so as to be directed to a desired direction.

Figure 5:
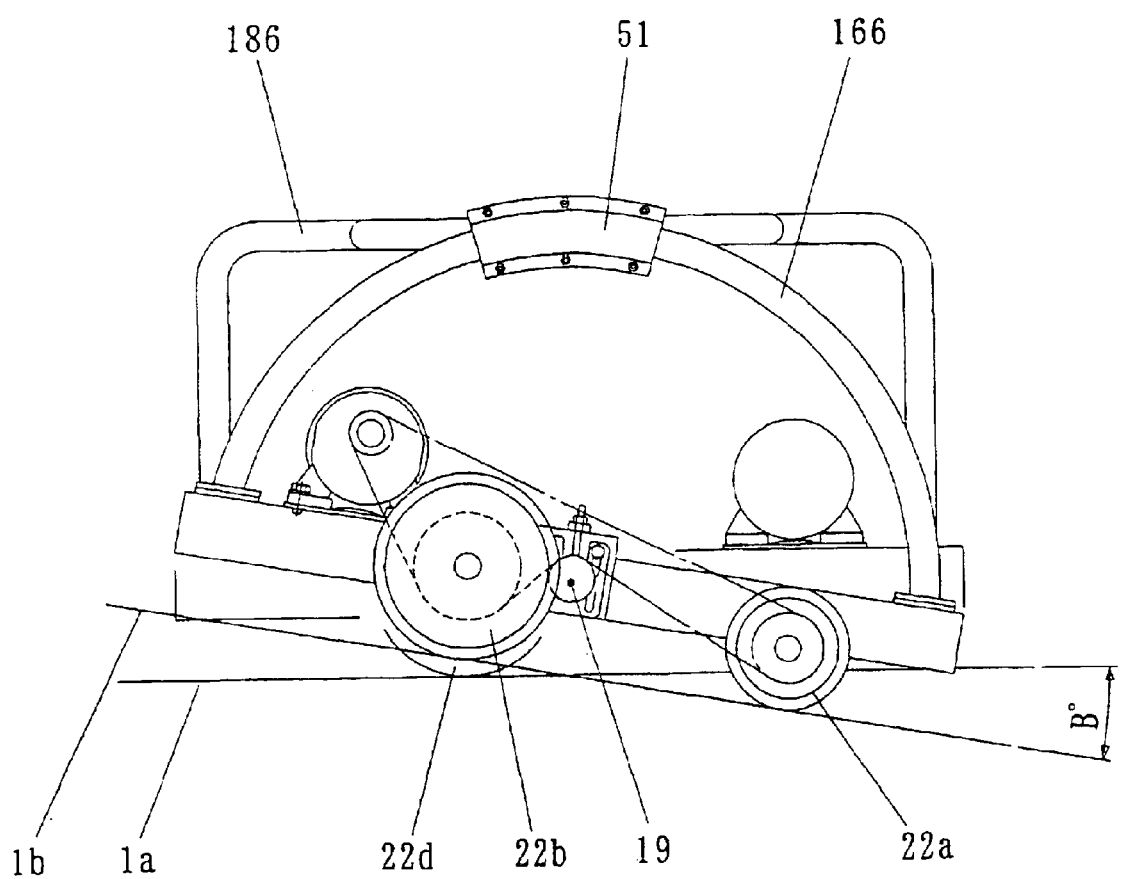
FIG. 5 shows an exemplary shape change of the entire frame of the apparatus shown in FIG. 1 through FIG. 4 at the time of an encounter with a twisted traveling surface (showing a right side view).

Explained next by referring to FIG. 5 is how the overall shape of the frame of the traveling carriage of the present invention changes when a twisted shape is encountered on a traveling surface.

FIG. 5 shows a state wherein the driving wheels 22c and 22d are in contact with a flat traveling surface 1a and the driving wheels 22a and 22b are in contact with a twisted and inclined traveling surface 1b. In other words, FIG. 5 shows a state wherein, due to the fact that the traveling surface 1b is inclined by B degrees as against the traveling surface 1a, the main structural member 161 has gyrated clockwise with the axis of the hinge pin 19 as the central point and, at the same time, the arc-shaped sliding rail 166 has slid through the sliding guide 51, resulting in the entire swinging frame 16 to be inclined as shown.

Effects of the arc-shaped sliding rail 166 and the sliding guide 51 are described as follows: Without the arc-shaped sliding rail 166 and the sliding guide 51, the hinge pin 19 is the only component that receives the load of the traveling carriage and the torque generated when the traveling carriage gyrates and moves, a force which twists the frame. With the arc-shaped sliding rail 166 and the sliding guide 51, on the other hand, the force acting upon the hinge pin 19 is dispersed, resulting in increased mechanical strength of the traveling carriage, which in tern permits the traveling carriage to be made lighter.

The preferred embodiment example of the apparatus of the present invention described above uses two means together: an axial supporting means by way of one hinge pin 19 and a supporting means by way of one sliding guide 51, as a means to so support the swinging frame 16 equipped with the arc-shaped sliding rail 166 that it swings freely. Not illustrated is a possibility of not using the hinge pin 19, in which case, one or more sliding guide 51 solely so supports the swinging frame 16 equipped with the arc-shaped sliding rail 166 that it swings freely.

The sliding guide 51 of the preferred embodiment example has an arc-shaped oil-free bush (not illustrated) made of an oil-free slidable material as a means to support the arc-shaped sliding rail 166. A ball-type bush having many steel balls may be used instead of such oil-free bush. Alternatively, a plural number of guiding rollers may be used instead of a bush.

A preferred embodiment example of the apparatus of the present invention was described above. The present invention is not limited to such preferred embodiment example, but various other embodiments are possible according to the scope of the present patent application.

As so constructed as described above, the present invention realizes the following effects:

Without the arc-shaped sliding rail 166 and the sliding guide 51, the hinge pin 19 is the only component that receives the load of the traveling carriage and the torque generated when the traveling carriage gyrates and moves, a force which twists the frame. With the arc-shaped sliding rail 166 and the sliding guide 51, on the other hand, the force acting upon the hinge pin 19 is dispersed, resulting in increased mechanical strength of the traveling carriage, which in tern permits the traveling carriage to be made lighter.

Of the four wheels, for example, installed onto the traveling carriage, none of such wheels breaks away from, and all of the four wheels are in contact with, a traveling surface, thereby enabling the apparatus to travel on and along a curved surface in a stable position and to have sufficient driving power.

Of the four belt wheels, for example, supporting two sets of caterpillars in case the traveling carriage is equipped with such caterpillars, none of such wheels breaks away from, and all of the four wheels are in contact with, a traveling surface, thereby enabling the apparatus to travel on and along a curved surface in a stable position and to have sufficient driving power.

What is claimed is:

1. A traveling carriage equipped with a traveling means to travel on and along a surface of an object, wherein a frame of said traveling carriage is composed of two divided frames to a right side and to a left side in a forward traveling direction, one of said divided frames is equipped with an arc-shaped sliding rail which forms an arc viewed from the right or the left side, said arc-shaped sliding rail is supported by a sliding guide installed onto another of said divided frames as to be capable of sliding along the arc-shaped sliding rail.

2. The traveling carriage of claim 1 comprising a hinge pin of the a same central axis as a central axis of a swinging of the two divided frames, said hinge pin connecting the two divided frames.

3. The traveling carriage as in any of claims 1–2 wherein the traveling means comprises wheels or caterpillars on each of the two divided frames.

* * * * *